March 30, 1965  B. O. KAPPELMANN ETAL  3,175,621
PLASTIC MULCH SHEET PICK-UP MACHINE Filed May 20, 1963  2 Sheets-Sheet 1

INVENTOR:
BENJAMIN O. KAPPELMANN,
BY & REO F. ELLIOTT.
ATTORNEY.

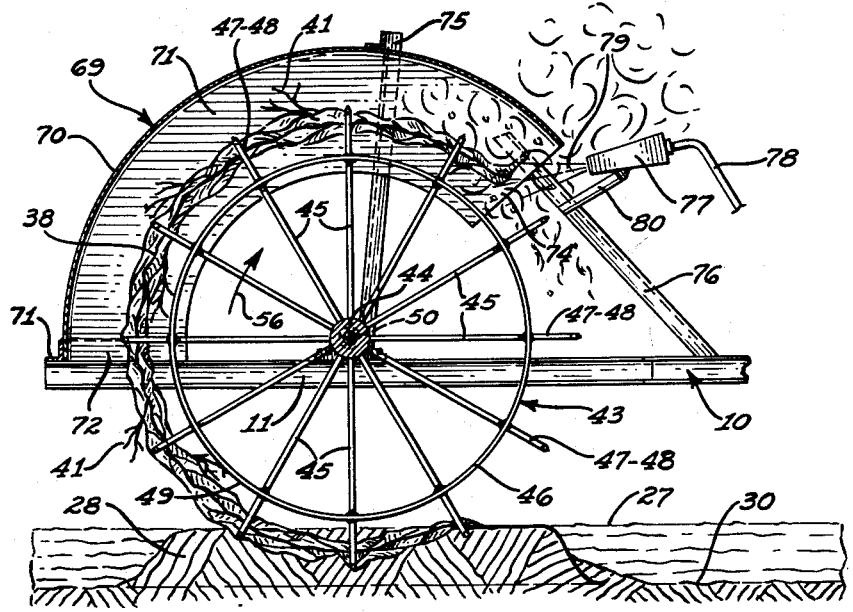
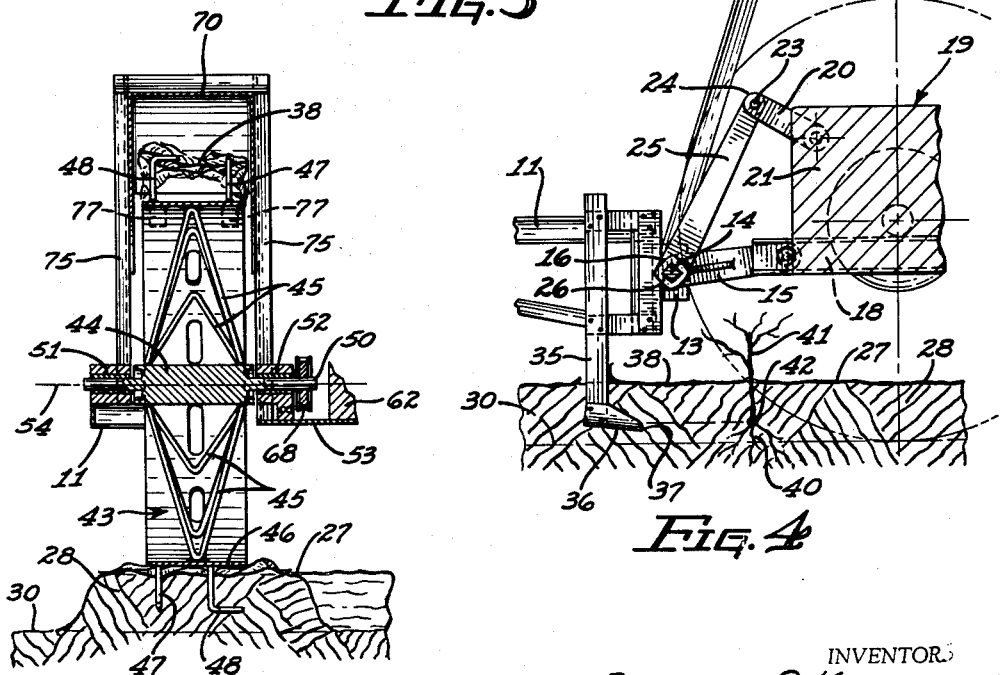

United States Patent Office 3,175,621
Patented Mar. 30, 1965

3,175,621
PLASTIC MULCH SHEET PICK-UP MACHINE
Benjamin O. Kappelmann, Phoenix, and Reo F. Elliott, Chandler, Ariz., assignors to Precision Agricultural Machinery Company, Phoenix, Ariz., a corporation of Arizona
Filed May 20, 1963, Ser. No. 281,489
3 Claims. (Cl. 171—53)

This invention pertains to agricultural machinery and is particularly directed to a machine for picking up plastic mulch sheet after crop harvesting has been completed.

At the conclusion of the growing season and the crop harvested in a field where plastic mulch sheets have been initially laid by equipment such as shown and described in application Serial Number 216,637, the problem then arises of removing the mulch sheets from the plant rows so that the field may be recultivated and prepared for the next crop. Since plastic mulch sheet material does not deteriorate or rot down, it is necessary to withdraw it from the plant row soil and gather it up and dispose of it by burning or collection so that it can be removed from the field area.

One of the objects of this invention is to provide a machine capable of picking up plastic sheet mulch from a plant row and remove it from the field area at the conclusion of the harvesting of the crop preparatory to readying the field for the next season's crop.

Another object of this invention is to provide a plastic mulch sheet pick-up machine which initially cuts the root system of plants projecting above a plastic mulch sheet at a point below the mulch sheet and then to rake up the mulch sheet by laterally applying snaring hooks and prongs thereto and lifting the gathered up mulch sheet material free of the soil and then to consume the picked up material by burning within the machine or otherwise collecting in a receptacle on or adjacent to the machine to be disposed of away from the field surface.

Further features and advantages of this invention will appear from a detailed description of the drawings in which:

FIG. 3 is a fragmentary sectional view on the line 3—3 of FIG. 1.

FIG. 4 is a fragmentary sectional view on the line 4—4 of FIG. 1.

FIG. 5 is a sectional view on the line 5—5 of FIG. 2.

Figures 1, 2:
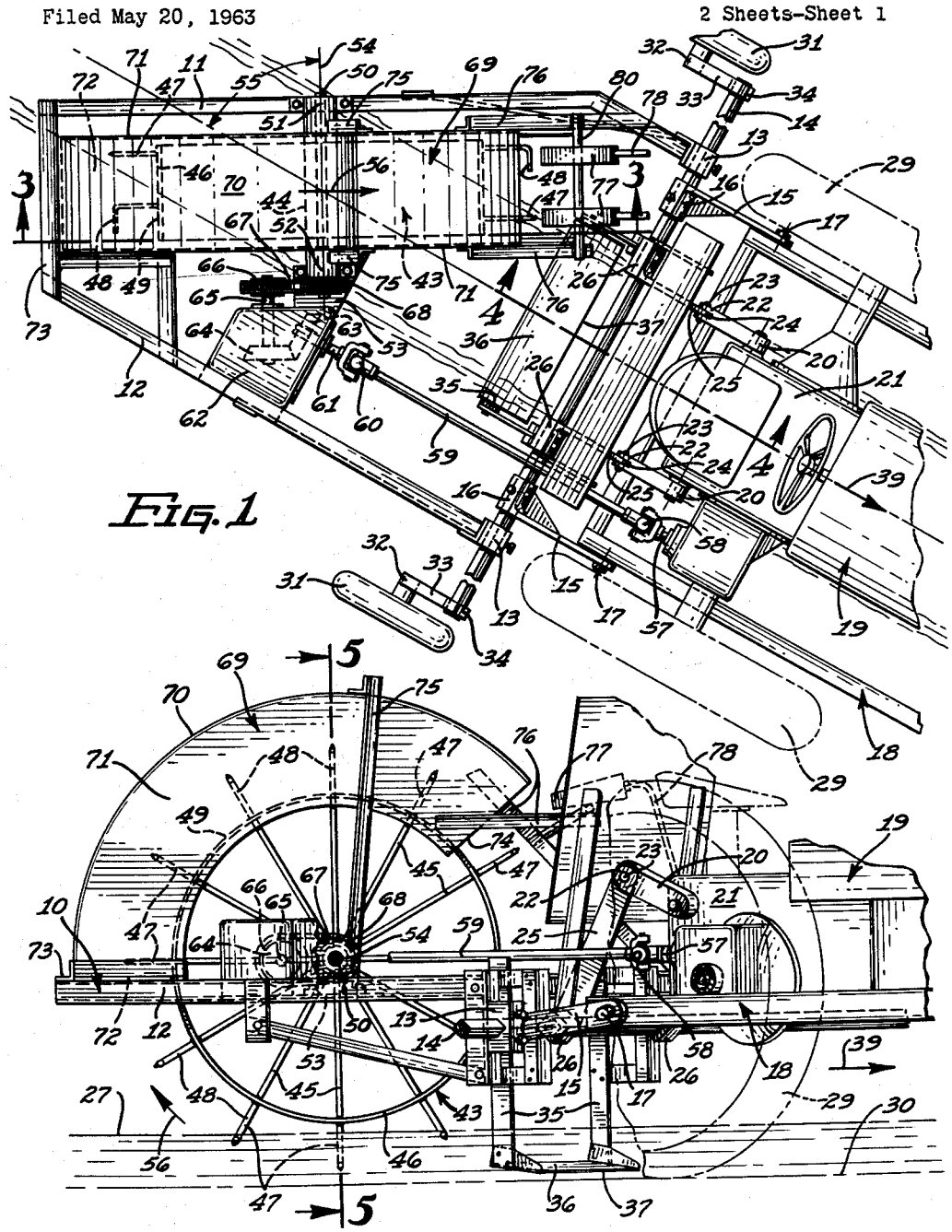
FIG. 1 is a plan view of a plastic mulch sheet pick-up machine incorporating the features of this invention.
FIG. 2 is a right hand side elevation of the apparatus shown in FIG. 1.

As an example of one embodiment of this invention there is shown a plastic mulch sheet pick-up machine comprising a frame indicated generally at 10 comprising a pair of side rails 11 and 12 which are rigidly fixed by suitable brackets 13 to the usual tool support bar 14 which in turn is fixed to the outer ends 16 of the pivot arms 15 pivotally mounted at their inner ends on suitable pivot bolts 17 carried on the chassis frame 18 of a tractor 19. The usual lift arms 20 on the transmission case 21 having their outer ends 22 pivotally connected by pins 23 to the outer ends 24 of the tool support bar lift arms 25 which in turn are fixed at their inner ends 26 to the tool support bar 14 whereby the tool support bar 14 and frame 10 may be swung up and down relative to the ground surface 27 of the plant row 28, the wheels 29 of the tractor 19 rolling in the furrow 30.

Ground engaging wheels 31 roll in the furrows 30 and are suitably journaled on the outer ends 32 of the wheel arms 33 which are fixed at their inner ends 34 to the outer ends of the tool support bar 14 so as to limit the downward position of the tool support bar 14 and frame 10 to ground surface 27 of the plant row 28.

Rigidly fixed to the tool support bar 14 are the laterally spaced downwardly extending cutter blade arms 35, FIG. 2, across the lower ends of which is fixed the laterally extending cutter blade 36 having the forwardly projecting horizontal cutting edge 37 which is located below the mulch sheet 38, FIG. 4, and the plant row ground surface 27 so that as the tractor 19 moves forwardly in the direction of the arrow 39 the cutting edge 37 will cut off the roots 40 of the plant 41 at the point 42 so that the plant portion 41 projecting up through the mulch sheet 38 is released from the ground to be subsequently picked up with the mulch sheet.

The thus freed plants 41 and mulch sheet 38 is removed from the plant row 28 by a specially constructed pick-up wheel indicated generally at 43. The pick-up wheel comprises a hub 44 to which are fixed the inner ends of the radially extending spokes 45 to the outer ends of which spokes is fixed the rim 46. Pick-up prongs 47 and hooks 48 project outwardly from the periphery 49 of the rim 46 so as to sweep laterally through the plant row at a depth substantially equal to the depth of the cutter blade 36. The hub 44 of the pick-up wheel is fixed to a drive shaft 50 which is journaled in a suitable bearing 51 carried on the said rail 11 of the frame 10 and at its other end in a suitable bearing 52 fixed to a bracket 53 fixed to the side rail 12 of the frame 10 so as to revolve about an axis 54 angularly related at 55 to the direction of travel 39 of the tractor.

The pick-up wheel 43 is driven in the direction indicated by the arrow 56 to cause the prongs 47 and hooks 48 to laterally attack the mulch sheet. By the power take-off shaft 57 of the tractor 19 which is connected through a universal joint 58 to a propeller shaft 59 and a universal joint 60 connected to the input shaft 61 of a power transmission 62 fixed to the bracket 53 of the frame 10. Power is transmitted through a bevel gear 63 in the transmission 62 fixed on the input shaft 61 to a bevel gear 64 fixed to the output shaft 65 of the transmission 62. A sprocket 66 is fixed on the outer end of the output shaft 65 over which operates the endless chain 67 which in turn operates over a sprocket 68 fixed to the drive shaft 50 of the pick-up wheel 43. Thus, the pick-up wheel 43 is positively rotated in the direction of the arrow 56 with a peripheral speed of travel of the pick-up prongs and hooks where they engage the mulch sheet 38 at substantially the speed of travel of the tractor 19, the prongs traversing relatively diagonally across the mulch sheet and plant row, from the left side to the right side thereof, entangling and wrapping up the mulch sheet and plant tops 41 on the wheel periphery as shown in FIG. 3.

The picked up mulch sheet and any plant particles which may be entangled therein may be doffed from the wheel at its upper portion or the materials may be incinerated and burned from the wheel prongs 47 and hooks 48. To this end there is provided a flame hood 69, FIG. 3, comprising a curved top cover 70 and arcuate integral side pieces 71 forming an enclosure for the peripheral portion of the pick-up wheel. The rear entrance end 72 of the flame hood 69 is fixed to the rear cross member 73 of the frame 10. The front discharge end 74 of the flame hood is supported by suitable brackets 75 and 76 on the frame 10. Gas burners 77 supplied from a suitable gas supply tank, not shown, on the tractor 19 through a gas supply line 78 are mounted on a bracket 80 and are arranged to project an intense Bunsen flame 79 into the discharge end 74 in opposition to the direction of pick-up wheel rotation to consume by incineration the mulch sheet and plant twigs as the prongs and hooks emerge from the flame hood 69.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appended claims are intended to be included herein.

Having thus fully set forth and described this invention what is claimed and desired to be obtained by United States Letters Patent is:

1. A plastic mulch sheet pick-up device for use in a plant row provided with a plant mulch sheet, said device comprising:
    (A) a tractor having a rearwardly extending frame pivotally mounted on the chassis thereof,
    (B) power means on said tractor adjustably positioning said frame,
    (C) laterally spaced frame supporting ground engaging wheels adapted to be disposed in adjacent crop furrows and wherein the plant mulch sheet is provided on the plant row between said adjacent crop furrows,
    (D) a transversely extending horizontally disposed cutter blade mounted on said frame, adapted to be disposed along said row and below said mulch sheet, and adapted to sever the roots of the plants below said mulch sheet,
    (E) a plant row contacting pick-up wheel journaled on said frame rearwardly of said cutter and having an axis angularly disposed relative to said cutter,
    (F) said pick-up wheel comprising prongs and hooks fixed to and projecting radially from the periphery thereof, and having snagging ends,
    (G) whereby as said tractor is moved along said plant row, and the cutter severs the roots, the prongs and hooks of said pick-up wheel will penetrate the mulch sheet and retain the same with the snagging ends.

2. A plastic mulch sheet pick-up device for use in a plant row provided with a plant mulch sheet, said device comprising:
    (A) a tractor having a rearwardly extending frame pivotally mounted on the chassis thereof,
    (B) power means on said tractor adjustably positioning said frame,
    (C) laterally spaced frame supporting ground engaging wheels adapted to be disposed in adjacent crop furrows and wherein the plant mulch sheet is provided on the plant row between said adjacent crop furrows,
    (D) a transversely extending horizontally disposed cutter blade mounted on said frame, adapted to be disposed along said row and below said mulch sheet, and adapted to sever the roots of the plants below said mulch sheet,
    (E) a plant row contacting pick-up wheel journaled on said frame rearwardly of said cutter and having an axis angularly disposed relative to said cutter,
    (F) said pick-up wheel comprising prongs and hooks fixed to and projecting radially from the periphery thereof, and having snagging ends,
    (G) whereby as said tractor is moved along said plant row, and the cutter severs the roots, the prongs and hooks of said pick-up wheel will penetrate the mulch sheet and retain the same with the snagging ends.
    (H) power actuating means on said frame for rotating said pick-up wheel to cause said prongs and hook to traverse relatively diagonally across the mulch sheet and plant row to entangle and wrap up the mulch sheet and plant tops on said pick-up wheel,
    (I) and means for receiving said pick-up material from said pick-up wheel at a point in its periphery remote from its ground contact area.

3. A plastic mulch sheet pick-up device for use in a plant row provided with a plant mulch sheet, said device comprising:
    (A) a tractor having a rearwardly extending frame pivotally mounted on the chassis thereof,
    (B) power means on said tractor adjustably positioning said frame,
    (C) laterally spaced frame supporting ground engaging wheels adapted to be disposed in adjacent crop furrows and wherein the plant mulch sheet is provided on the plant row between said adjacent crop furrows,
    (D) a transversely extending horizontally disposed cutter blade mounted on said frame, adapted to be disposed along said row and below said mulch sheet, and adapted to sever the roots of the plants below said mulch sheet,
    (E) a plant row contacting pick-up wheel journaled on said frame rearwardly of said cutter and having an axis angularly disposed relative to said cutter,
    (F) said pick-up wheel comprising prongs and hooks fixed to and projecting radially from the periphery thereof, and having snagging ends,
    (G) whereby as said tractor is moved along said plant row, and the cutter severs the roots, the prongs and hooks of said pick-up wheel will penetrate the mulch sheet and retain the same with the snagging ends.
    (H) power actuating means on said frame for rotating said pick-up wheel to cause said prongs and hook to traverse relatively diagonally across the mulch sheet and plant row to entangle and wrap up the mulch sheet and plant tops on said pick-up wheel,
    (I) means for receiving said pick-up material from said pick-up wheel at a point in its periphery remote from its ground contact area,
    (J) said last mentioned means including an arcuate hood fixed on said frame over the upper peripheral portion of said pick-up wheel,
    (K) and a burner fixed on said frame arranged to project an incinerating flame in one end of said hood in a direction opposite to the direction of peripheral rotation of said pick-up wheel.

References Cited by the Examiner
UNITED STATES PATENTS

| | | | |
|---|---|---|---|
| 848,217 | 3/07 | Webb et al. | 171—53 X |
| 1,018,513 | 2/12 | Meyer. | |
| 1,935,199 | 11/33 | Albrecht | 171—1 |
| 2,429,743 | 10/47 | Bingham et al. | 171—53 |
| 2,535,960 | 12/50 | Schmidt | 171—53 |
| 2,652,679 | 9/53 | Krause | 56—377 X |

T. GRAHAM CRAVER, *Primary Examiner.*
ANTONIO F. GUIDA, *Examiner.*